United States Patent [19]
Estey et al.

[11] 4,431,306
[45] Feb. 14, 1984

[54] METHOD AND APPARATUS FOR PRECISION CONTROL OF RADIOMETER

[75] Inventors: Roger S. Estey, Santa Barbara; Michael F. Hanna, Covina, both of Calif.

[73] Assignee: The United States of America as represented by the Administrator of the National Aeronautics and Space Administration, Washington, D.C.

[21] Appl. No.: 259,212

[22] Filed: Apr. 30, 1981

[51] Int. Cl.³ .............................................. G01J 1/10
[52] U.S. Cl. ..................................... 356/216; 356/234
[58] Field of Search ................ 356/213, 216, 218, 234

[56] References Cited

U.S. PATENT DOCUMENTS

| | | | |
|---|---|---|---|
| 3,331,022 | 7/1967 | Maione | 324/96 |
| 3,360,726 | 12/1967 | Peters, Jr. | 324/119 |
| 3,476,914 | 11/1969 | Cussen | 219/499 |
| 3,601,611 | 8/1971 | Kendall, Sr. | 250/83.3 H |
| 3,780,273 | 12/1973 | Turrell | 235/150.52 |
| 4,079,313 | 3/1978 | Callan | 324/142 |
| 4,177,566 | 12/1979 | Haines | 356/213 |

*Primary Examiner*—Bruce Y. Arnold
*Attorney, Agent, or Firm*—John R. Manning; Paul F. McCaul; Thomas H. Jones

[57] ABSTRACT

A radiometer controller (11) of a radiation detector (10) is provided with a calibration method and apparatus comprised of mounting all temperature sensitive elements of the controller in thermostatically controlled ovens (26) during calibration and measurements, using a selected temperature that is above any which might be reached in the field. The instrument is calibrated in situ by adjusting heater power (EI) to the receptor cavity (12) in the radiometer detector to a predetermined full scale level as displayed by a meter (30). Then with the heater de-energized and the receptor cavity covered, the voltage output, ($E_o$) is set to zero as displayed by the meter. Next the preset power is applied to the heater and the output of the radiant measurement channel is applied to the panel meter. With this preset heater power producing the proper heat, the gain of the measurement channel is adjusted to bring the meter dispaly to full scale. The function switch (36) is then set back to apply the measured radiant power signal to the meter. Once the radiation cavity is uncovered, radiant energy absorbed by the radiation cavity is displayed by the meter with an accuracy that heretofore has not been available. A reference voltage $E_R$ is used to calibrate the meter initially and at any time thereafter deemed necessary. To adjust the heater power to the predetermined full scale level, current and voltage values applied to the heater winding are separately derived from a bridge-like circuit (FIG. 2) connected between a source of heater power and ground, and applied to precision analog multiplier mounted in a thermostatically controlled oven.

10 Claims, 2 Drawing Figures

4,431,306

METHOD AND APPARATUS FOR PRECISION CONTROL OF RADIOMETER

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

FIELD OF THE INVENTION

This invention relates to the art of radiometry, and more particularly to an improved method and apparatus for control of a radiometer to measure radiation with a high degree of precision.

BACKGROUND OF THE INVENTION

A radiometer is comprised of two units: a radiation receptor, which contains a "black body cavity" and a compensating cavity, or other compensating element both of which are located in a heatsink, and a controller. The radiation detector absorbs radiant energy and generates a voltage proportional to the power of the radiation received. The function of the controller is to calibrate the radiation detector and to amplify for display the voltage generated.

Since the principal use of a radiometer is to measure the sun's radiation, both units are exposed to radiation and therefore subjected to a range of ambient temperatures great enough to generate errors that prevent the radiometer from reaching its full capability of precision, which is three hundredths percent accuracy. Due to the time variability of solar radiation, there is often need to collect radiation data at specific times. It is therefore necessary for this high precision to be maintained over relatively long periods of time.

The absolute accuracy of radiation measurements in general, and solar measurements in particular, has been increasing, but the present level of accuracy is only a few tenths of a percent. Current solar and atmospheric research now demands the higher accuracy of three hundredths percent, and further demands that such higher accuracy be maintained over relatively long periods of time. This requires an improvement in the radiometer controller of at least one order of magnitude.

SUMMARY OF THE INVENTION

In accordance with the present invention, improvement in the radiometer controller of an instrument is achieved by a calibration method and appartus comprised of mounting all temperature sensitive elements of the controller in a thermostatically controlled oven, both during calibration and during measurements, using a selected temperature that is above any which might be reached in the field. After the controlled oven temperature has stabilized, the instrument is calibrated in situ by first setting a function switch to "Heater" (EI→METER) and adjusting heater power to the receptor cavity in the radiometer detector to a predetermined full scale level as displayed by a meter, e.g., 100 milliwatts. Then with the heater de-energized, the function switch at "Flux" ($E_o$→METER) and the receptor cavity of the radiometer detector covered, the voltage output, which is proportional to the radiation power received, is set to zero as displayed by the same meter used for setting the heater power. Next the function switch is set to "Scale" which connects the preset power to the heater (EI→HEATER) through a power switch $S_1$ and the output of the radiant measurement channel to the panel meter ($E_o$→METER). With this preset heater power producing the proper heat, the gain of the measurement channel is adjusted to bring the meter display to full scale. The function switch is then set back to receive the measured radiant power signal ($E_o$→METER). Once the radiation cavity is uncovered, radiant energy absorbed by the radiation cavity is displayed by the meter with an accuracy that heretofore has not been available. A reference voltage may also be connected to the meter for calibration of the meter when appropriate.

To adjust the heater power to the predetermined full scale level, current and voltage values applied to the heater winding are separately derived from a bridge-like circuit connected between a source of heater power and ground, and are applied to a precision analog multiplier mounted in a thermostatically controlled oven. Current is measured as a voltage across a precision resistor conected to ground which forms one branch of the bridge-like circuit which is in series with the heater winding and the heater winding connecting cable. Opposite the current measuring resistor is a precision matched resistor, and opposite the heater and the resistance of the connecting cable is a potentiometer connected to ground and connected in series with a resistance which exactly matches the resistance of the cable connecting the heater to the bridge. This potentiometer is adjusted to produce a voltage drop exactly equal to the voltage across the heater. The voltage across the precision resistor connected to ground on one side of the bridge-like circuit thus produces a voltage signal as a measure of current through the heater winding, while the voltage across the potentiometer connected to ground on the other side of the bridge-like circuit thus represents a measure of the voltage across the heater windings. The product of these two signals referenced to ground thus yields a signal proportional to heating power. A control potentiometer in series with the bridge-like circuit is then used to adjust the level of heating power. This bridge-like circuit assures that neither the current nor the voltage inputs to the analog multiplier are floating above ground.

The novel features that are considered characteristic of this invention are set forth with particularlity in the appended claims. The invention will best be understood from the following description when read in connection with the accompanying drawings.

DESCRIPTION OF PREFERRED EMBODIMENTS

Figure 1:
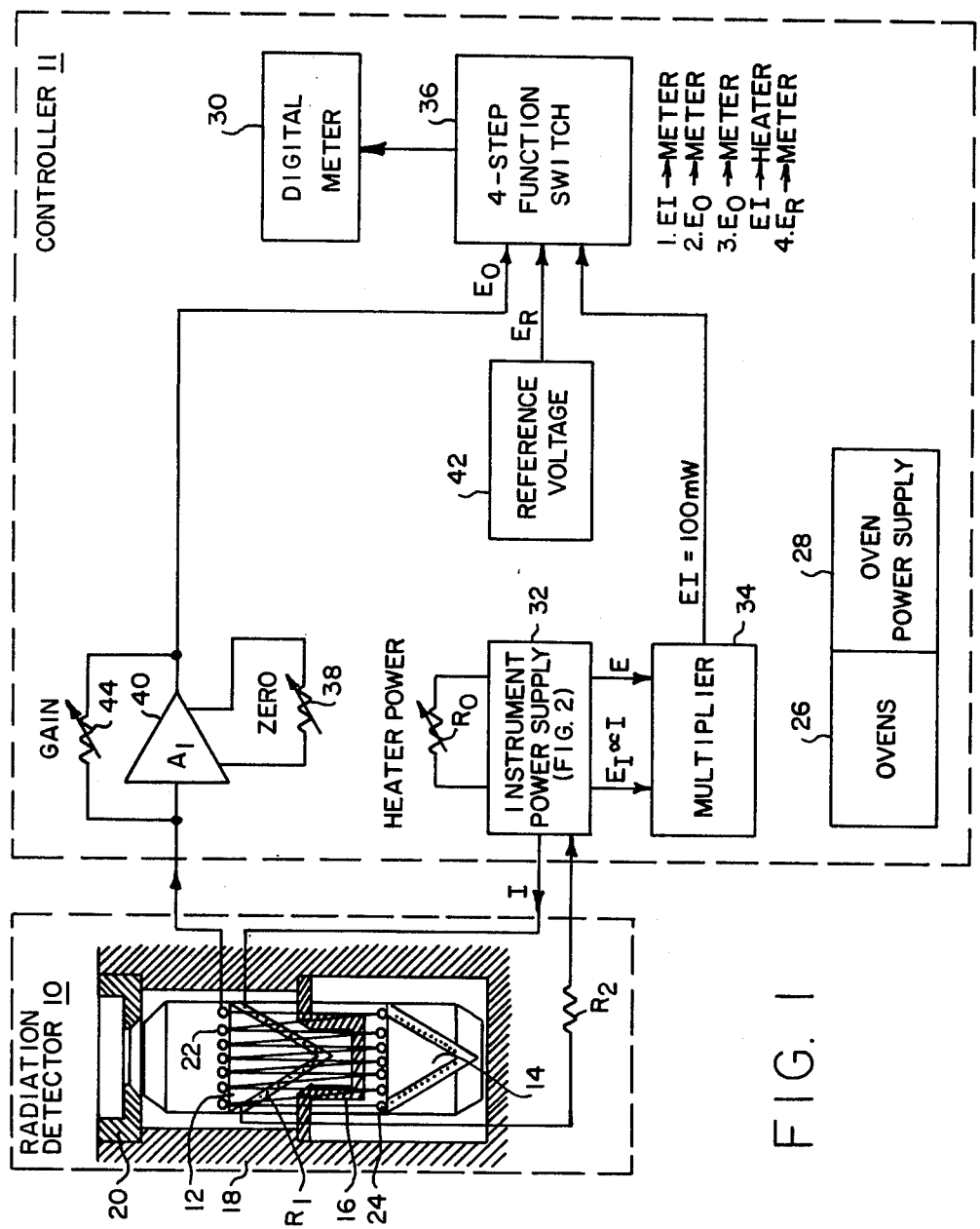
FIG. 1 is a system block diagram of an instrument for measuring radiation in accordance with the present invention.

Referring now to FIG. 1, an instrument is disclosed for measuring radiation utilizing a radiation detector 10 and a controller 11. The radiation detector 10 is comprised of a receptor cavity 12 and a compensating cavity 14 supported by a thermally high-conductance bridge 16 inside a heatsink 18 that completely surrounds the cavities, except at the aperture of the receptor cavity 12 where a collar 20 defines the cavity aperture. A heater winding having a resistance $R_1$ is integral with the receptor cavity and is connected to the controller 11 by a cable having a resistance $R_2$.

Thermojunctions 22 and 24 on the respective receptor and compensating cavities (or more particularly on ring-shaped pieces of copper joined to the receptor and compensating cavities) are joined together to form a thermopile which generates an emf proportional to the difference of temperature $\Delta T$ between the cavities. When neither radiation heating nor electric heating is applied to the receptor cavity, the temperature difference between the cavities drops to zero, and the thermopile output likewise drops to zero. When either type of heating (e.g., 100 mW/cm$^2$) is applied to one of the cavities, the heated cavity warms to a little less than 1° K. above the temperature of the heatsink, and the thermopile generates an output of almost 1 mV.

The organization and operation of the radiation detector thus far described is conventional. In some cases the compensating cavity may also have a heater winding useful for particular experiments which do not form any part of the present invention.

Since the principal use of the instrument is as a pyrheliometer, both the radiation detector 10 and its controller 11 are exposed to a range of solar radiation great enough to prevent the instrument from reaching its full capability for accuracy were it not for the mounting of all controller elements, or at least the critical elements, in temperature-controlled ovens represented by a block 26 which are powered by a power supply represented by a block 28. In addition, low tempco (temperature-coefficient of resistance) circuit components are used as far as possible in the controller.

This arrangement permits mitigation of temperature induced errors by first, with control set to "Heater," adjusting through a potentiometer $R_o$ the heater power to full scale of a digital meter 30 calibrated in milliwatts, e.g., 100.00 milliwatts, while the heater power from an instrument power supply 32 is computed by a precision analog multiplier 34 and displayed by the digital meter through a function switch 36 to "Heater," thus being in a position to connect the power signal, EI, to the meter. Then with the radiation detector 10 still covered and the control at "Flux," the next step is to adjust a ZERO potentiometer 38 to zero the output of an operational amplifier 40, as displayed on the meter. Now when the radiation detector 10 is uncovered, the temperature difference between the cavities of the radiation detector will vary and produce an output signal, $E_o$, at the output of the amplifier 40 that is proportional to the radiation being received. The ambient temperature will not adversely affect the reading because the ambient influences both cavities equally through the case which acts as a heat sink and the thermal bridge 16.

For the independent calibration of the digital meter 30, a reference voltage, $E_R$, from a source 42 is connected to the input of the meter 30 by the function switch 36. Comparison of the reference voltage value with the panel meter reading serves to calibrate the latter.

To summarize the procedure for using the instrument, power to the ovens and the instrument is first turned on while the radiation detector is still covered. At least thirty minutes is allowed for warmup. Then with the instrument aligned to receive the radiation to be measured, the calibration and measurement steps are performed in the following sequence:

1. With the function switch 36 set to a first position "Heater" to connect the heater power measurement to the meter (EI→METER), a power potentiometer $R_o$, is adjusted to display full scale (100.00 mW) on the meter after a potentiometer $R_4$ (FIG. 2) is adjusted to make $R_4 + R_5 = R_1 + R_2$.
2. With the function switch 36 set to a second position "Flux" to connect the measurement output to the meter ($E_o$→METER) while the instrument is still covered and the heater power removed, the meter display is adjusted to zero using the ZERO potentiometer 38.
3. With the function switch in a third position "Scale" to connect the heater voltage to the input of the heater and the output of the measurement channel to the digital meter ($E_o$→METER, and EI→HEATER), a gain adjustment is made on the measurement channel to set the digital meter display to full scale (100.00 mW), using potentiometer 44.
4. When appropriate, the function switch is turned to a fourth position, "Reference," to connect the reference source 42 to the digital meter 30 ($E_R$→METER) to display the reference voltage $E_R$.
5. After the foregoing steps have been completed, the radiation detector is uncovered, the function switch is set to the second position ($E_o$→METER), and a radiation measurement is read from the digital meter 30.

Although the calibration steps 1–3 can be repeated at anytime to verify the calibration of the radiometer, once calibration is verified, several radiation measurements can be made over a relatively long period with confidence that the radiation detector 10 will transduce the incoming radiation into a proportional voltage with 0.03 percent accuracy.

The digital meter consists of an analog-to-digital converter and a digital display unit. The converter itself may have a small temperature coefficient of resistance and could, if necessary, be located in an oven, as is the multiplier 34, instrument power supply 32, and amplifier 40 with its related potentiometers. The ovens are controlled to supply a constant temperature environment for these components at a temperature slightly above highest ambient temperature anticipated, such as 65° C. Nevertheless, to mitigate any meter error, the reference voltage can be used to calibrate the digital meter from time to time by repeating the fourth calibration step. The refrence voltage is set to a value equal to the meter full scale using precision components located in the oven. This reference voltage is itself initially calibrated before field measurements with higher accuracy than the digital meter can display.

Figure 2:
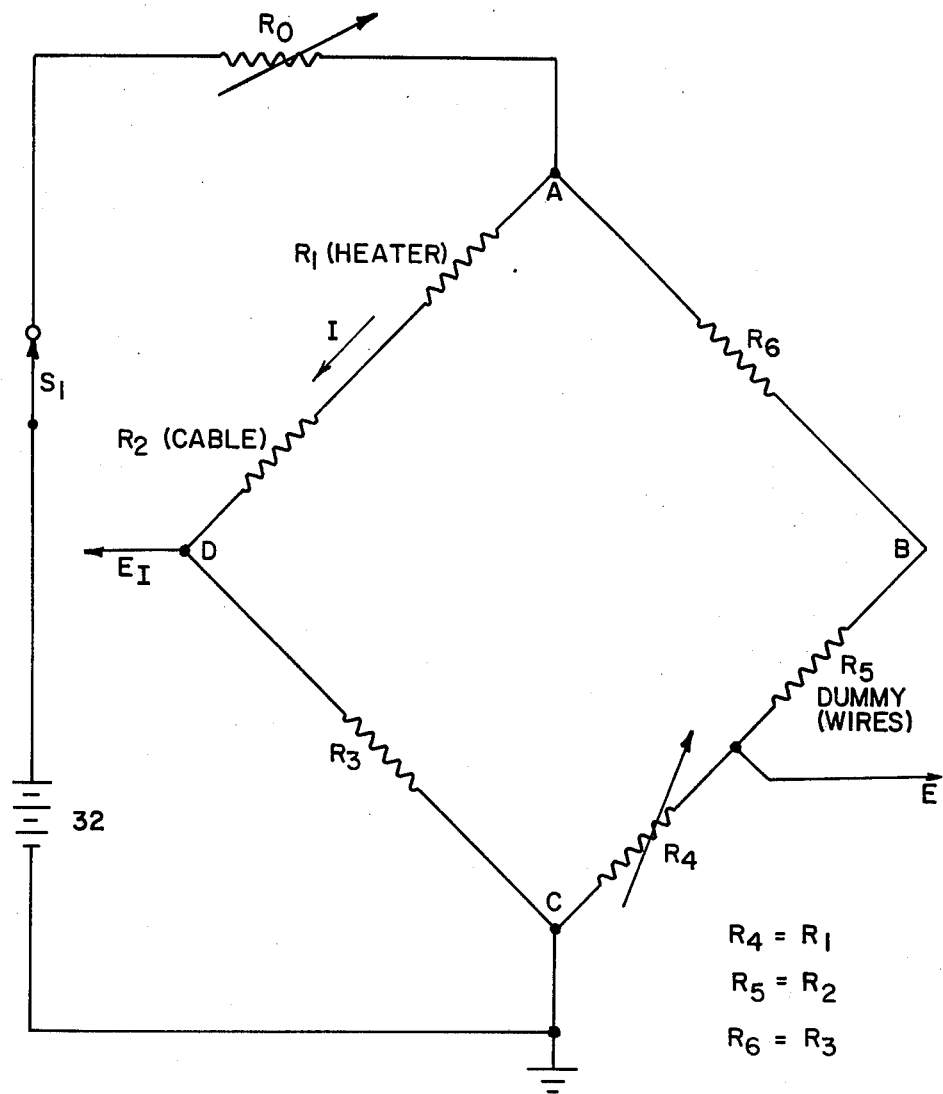
FIG. 2 is a circuit diagram of a bridge-like circuit for sensing current and voltage applied to a cavity heater of the radiation detector in the system of FIG. 1.

The first step of adjusting the power to the heater of the radiation detector 10 is as important as providing a controlled temperature for the environment of critical components for the instrument. FIG. 2 illustrates the manner in which the power supply 32 provides heating power from a regulated power supply in block 32 to the heater winding $R_1$ in the radiation detector 10 through its connecting cable having a resistance $R_2$ shown as a lumped resistance element in FIGS. 1 and 2. To complete the current path, a precision resistor $R_3$ is connected in series with $R_1$ and $R_2$ to complete one half (two sides) of a bridge-like circuit. The other half of the circuit is comprised of a potentiometer $R_4$, the resistance $R_5$ of dummy wires preferably placed along the same path as the heater cable and having a resistance equal to the resistance $R_2$ of the heater cable, and a precision resistor $R_6$ equal to the resistor $R_3$ (10 ohms ±0.01 percent) on the diametrically opposite side of the bridge.

The resistance $R_1$ of the cavity heater is about 200 ohms and the resistance $R_2$ of its connecting cable is about 0.05 ohms. The potentiometer $R_4$ is selected to closely match $R_1$. Before starting field measurements, the resistor $R_4$ is adjusted to exactly equalize the voltages across the sides AD and BC of the bridge. When the bridge is energized by power at point A through a potentiometer $R_o$ upon closing a switch $S_1$, and the potentiometer $R_4$ is adjusted to exactly match voltages between points B and D with respect to ground, the voltage drop across the potentiometer $R_4$ is exactly the same as that across the heater $R_1$, and is easily measured as a voltage E applied to the multiplier 34 (FIG. 1). The current through the heater must also pass through the precision resistor $R_3$. Consequently, the current is easily measured as a voltage I across the resistor $R_3$. That voltage signal, $E_I$, is also applied to the multiplier which then produces a voltage signal equal to the product EI. Both voltage signals EI and E are thus referenced to ground, thereby insuring that neither the current nor the voltage signal to the analog multiplier is floating above ground. During calibration in the field, just prior to measurements, the potentiometer $R_o$ is adjusted to provide a power output measurement of 100.00 mW.

It is thus evident that a new and improved method and apparatus are provided for control of a radiometer for precision measurements using low tempco circuit components as far as possible and mounting all critical elements in a temperature controlled oven. The compensating cavity of the radiometer is stabilized in the thermal environment by technology using a thermal bridge and the case as a heat sink. The measuring cavity is calibrated from time to time by means which are extremely stable, reproducible and convenient. By the means described, radiation measurements may then be made with high accuracy.

Although a particular embodiment of the instrument has been described and illustrated, it is recognized that modifications and equivalents may readily occur to those skilled in this art. Consequently, it is intended that the claims be interpreted to cover such modifications and equivalents.

What is claimed is:

1. A method of making radiation measurements in the field using an instrument having a radiation detector and controller, said radiation detector containing a heatsink, a radiation receiving cavity and a compensating element, both said cavity and compensating element being thermally coupled to said heatsink, and said controller having precision means including a source of power having one terminal connected to circuit ground for heating said cavity electrically, means for measuring the electrical power supplied to heat said cavity, means for amplifying an electrical signal from said radiation detector which is proportional to the difference in temperature between said cavity and compensating element, and means for displaying the amplified signal, said method comprising the steps of:

heating said cavity with a predetermined amount of electrical power and displaying the amount of said heating power on said display means;

with said radiation receiving cavity covered, said heater de-energized, and said display means connected to display the output of said amplifying means, adjusting said amplifying means to display a zero output from said receiving cavity;

with said display means connected to the output of said amplifying means, with said receiving cavity covered, and with said predetermined heater power connected to said cavity, adjusting the gain of said amplifying means to the same scale of said display means as used for display of said heating power; and with the receiving cavity uncovered and said heater power disconnected, amplifying the electrical signal from said radiation detector with said amplifying means and displaying the amplified signal on said meter.

2. The method as defined in claim 1 including the step of maintaining said controller at a regulated temperature above any temperature which said controller may reach in the field while exposed to the sun during use.

3. The method as defined in claim 1 wherein said predetermined electrical power is applied to said cavity by a heating element having a resistance that is known approximately, and said power is measured by connecting said heating element in series with a first precision resistor with a cable to form a first series circuit between the ungrounded terminal of said source of power and said circuit ground, thereby to produce a voltage signal across said precision resistor proportional to current through said heating element, said cable between said heating element and said precision resistor having a resistance that is known approximately, connecting a second series circuit in parallel with said first series circuit between the ungrounded terminal of said source of electrical power and said circuit ground, said second series circuit being comprised of a second precision resistor having a resistance equal to said first precision resistor, said second precision resistor being connected to said source of power, a potentiometer connected to circuit ground and said second precision resistor being connected to said potentiometer by means having a resistance equal to said cable resistance, thereby to form a bridge-like circuit with said potentiometer opposite said heating element, adjusting said potentiometer to match the voltage drop across said potentiometer and connecting resistance in series with the voltage drop across said heating element and cable in series, thereby matching the resistance of said potentiometer to the resistance of said heating element to produce a voltage drop across said potentiometer equal to the voltage drop across said heating element, multiplying said voltage drop produced across said first precision resistor by said voltage drop produced across said potentiometer to produce a voltage signal proportional to electrical power applied to said heating element, and adjusting the level of voltage applied to said bridge-like circuit to adjust the level of heating power to said predetermined amount of electrical power.

4. The method as defined in claim 3, wherein a panel meter is provided for display of said voltage signal, and including the step of using a reference voltage to calibrate said panel meter prior to use of the instrument in the field.

5. Apparatus for making radiation measurements in the field comprising a radiation detector having a heatsink, a radiation receiving cavity, and a compensating element, both said cavity and said compensating element being thermally coupled to said heatsink, and means for heating said receiving cavity with a predetermined amount of electrical power, a controller having a source of electrical power for heating said cavity, means having an input and an output for amplifying an electrical signal from said radiation detector which is proportional to the difference in temperature between said cavity and said element, said means for amplifying having means for adjustment of the gain thereof and means for adjustment of the static output thereof to zero for no input, means having a display scale for displaying the amplitude of electrical signals, and switching means for selectively connecting to said display means the following signals:

(a) an electrical signal proportional to the heating power supplied to said cavity for calibrating the full scale of said display means utilizing means for adjusting the level of heating power to full display scale;

(b) the output of said amplifying means to said display means while said receiving cavity is not receiving radiation for adjustment of said output to zero through said means for amplifying for adjustment; and (c) the output of said amplifying means to said display means while said amplifying means is receiving a signal from only the receiving cavity, and said receiving cavity is receiving radiation to be measured.

6. Apparatus as defined in claim 5 including a source of reference voltage, wherein said switching means includes means for connecting said display means to said reference voltage.

7. Apparatus as defined in claim 5 wherein said means for heating said cavity receives power from a voltage source through a bridge-like circuit comprised of the resistance of said heating means and of a connecting cable in series with a first precision resistor between said source of power and ground, and a second precision resistor in series with a resistance equal to the resistance of said cable and with a resistor equal to the resistance of said heating means between said source of power and ground, and said controller includes multiplying means connected to receive a voltage signal developed across said first precision resistor as a voltage drop representative of current through the resistance of said heating means, and a voltage signal developed across said resistor equal to the resistance of said heating means, said last signal being developed as a voltage representative of voltage drop across said heating means, and said multiplying means operating to produce a voltage signal proportional to power applied to said heating means.

8. Apparatus as defined in claim 7 wherein said resistor equal to said resistance of said heating means is a potentiometer for adjustment of resistance to the equality required.

9. Apparatus as defined in claim 7 or 8 including a potentiometer in series with said source of power and said bridge-like circuit for adjustment of the power applied to said heating means.

10. Apparatus as defined in claim 9 including means for controlling the environmental temperature of said controller.

* * * * *